(12) United States Patent
Flaherty et al.

(10) Patent No.: US 6,250,610 B1
(45) Date of Patent: *Jun. 26, 2001

(54) MOLDED COOLING TOWER

(75) Inventors: John C. Flaherty, Fairfield; Wayne Paterson, W. Orange; George Dilts, West Milford, all of NJ (US)

(73) Assignee: Delta Cooling Towers, Inc., NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/379,152

(22) Filed: Aug. 23, 1999

Related U.S. Application Data

(60) Provisional application No. 60/097,904, filed on Aug. 26, 1998.

(51) Int. Cl.[7] .................................................. B01F 3/04
(52) U.S. Cl. ................................. 261/109; 261/DIG. 11
(58) Field of Search ............................. 261/24, 108, 111, 261/109, DIG. 11

(56) References Cited

U.S. PATENT DOCUMENTS

| | | | |
|---|---|---|---|
| 2,445,908 | * | 7/1948 | De Flon et al. ............. 261/DIG. 11 |
| 2,626,129 | * | 1/1953 | Obert ........................... 261/DIG. 11 |
| 3,195,870 | * | 7/1965 | Gruber et al. ............... 261/DIG. 11 |
| 3,384,165 | * | 5/1968 | Mathews ...................... 261/DIG. 11 |
| 3,792,841 | * | 2/1974 | Munters ....................... 261/DIG. 11 |
| 4,416,836 | * | 11/1983 | Sinek .......................... 261/DIG. 11 |
| 4,422,983 | * | 12/1983 | Bardo et al. ........................... 261/24 |
| 4,637,903 | * | 1/1987 | Bardo et al. ................ 261/DIG. 11 |
| 4,913,710 | * | 4/1990 | Reverdy ....................... 261/DIG. 11 |
| 4,976,895 | * | 12/1990 | Bardo ................................. 261/108 |
| 5,028,357 | * | 7/1991 | Bardo .......................... 261/DIG. 11 |
| 5,227,095 | * | 7/1993 | Curtis .............................. 261/111 X |

FOREIGN PATENT DOCUMENTS

1127379 * 4/1962 (DE) ........................... 261/DIG. 11

* cited by examiner

Primary Examiner—Richard L. Chiesa
(74) Attorney, Agent, or Firm—Anthony J. Casella; Gerald E. Hespos; Michael J. Porco

(57) ABSTRACT

A cooling tower is provided for industrial process cooling as well as air conditioning systems. The cooling tower includes a tower shell that is unitarily molded from a plastic material. The tower shell includes opposed parallel top and bottom walls, a bottom connecting wall extending upwardly and outwardly from the bottom wall, a top connecting wall extending downwardly and outwardly from the top wall and a side wall extending between the connecting walls. Supports are unitarily molded and extend outwardly from the bottom connecting wall for supporting a tower shell and filler material disposed therein.

10 Claims, 5 Drawing Sheets

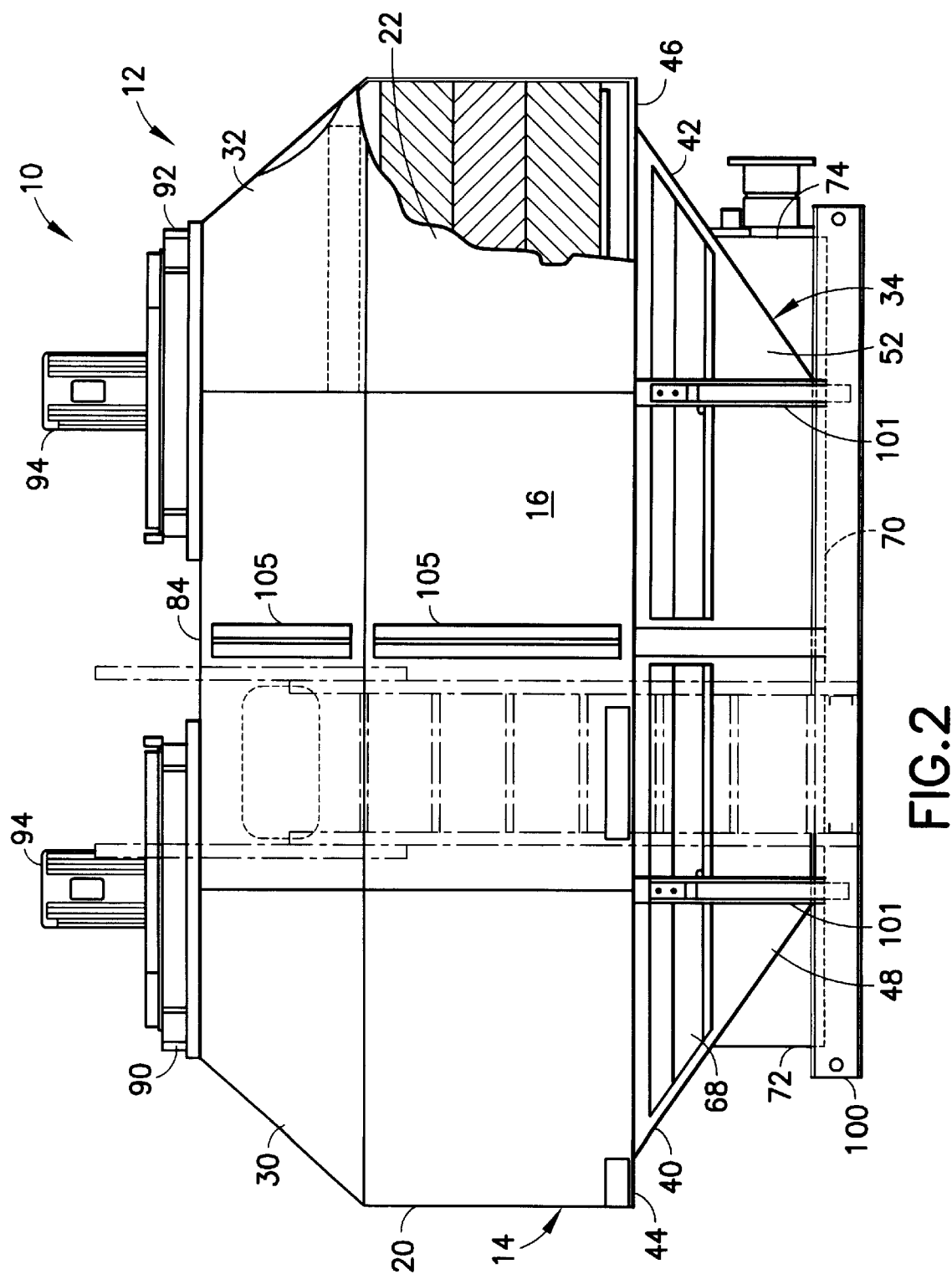

MOLDED COOLING TOWER

This application claims priority on Provisional patent Appl. Ser. No. 60/097,904, filed Aug. 26, 1998.

BACKGROUND OF THE INVENTION

1. Field of the Invention

The subject invention relates to cooling towers for air conditioning systems and industrial process cooling.

2. Description of the Prior Art

Air conditioning systems for large buildings employ cooling towers for carrying out a portion of the heat exchange that is essential to the cooling process. Industrial processes (e.g., chemical production, metals industry, plastics industry, food processing, etc.) generate heat that must be disposed of, often by use of cooling towers. The cooling tower is a housing that channelizes air in proximity to a heat exchange fluid. For example, a heat exchange fluid may be circulated through the cooling tower, and at least one fan may be mounted on the cooling tower to generate a flow of cooling air in proximity to the heat exchange fluid. Heat is transferred from the heat exchange fluid to the air, largely through the evaporation of a small percentage of fluid which substantially lowers the temperature of the primary heat exchange fluid. The cooled heat exchange fluid can then return to the process to perform a heat exchange function for either industrial process equipment or commercial air conditioning system.

The efficiency of an air conditioning system depends, in part, upon the heat exchange carried out in the cooling tower. Large buildings require large cooling towers, and in many instances an array of large cooling towers. Industrial processes depend on cooling towers to prolong the life of other equipment as well as produce top quality production.

The majority of prior art cooling towers are assembled from a plurality of pieces of sheet metal that are mounted to a metallic support frame. These prior art cooling towers typically are manufactured at a location remote from the installation site, and then are shipped to the installation site in a substantially assembled form. These large metallic prior art cooling towers are fairly heavy, and therefore require extensive structural support and greater transportation costs. Furthermore, the size and weight of prior art cooling towers complicates the hoisting and installation of the cooling tower onto the roof of the building. Costs of prior art cooling towers also are adversely affected by the labor intensive process for manufacturing and assembling the various metallic components of the prior cooling tower.

In addition to the cost penalties, the metallic sheet material used in prior art cooling towers generates significant vibration related noise due to the rotation of the fans and due to the flow of air through the cooling tower. Noise pollution often requires noise abatement measures that complicate the installation process and that further add to costs.

Prior art metallic cooling towers also are subject to corrosion or rust. Thus, prior art cooling towers have a relatively short life. Corrosion and rust problems can be avoided or deferred by employing corrosion or rust resistant alloys. However, these metallic materials further add significantly to the cost of the prior art cooling tower.

The prior art includes two types of cooling towers made with plastics. The first type of prior art plastic cooling tower is fabricated from a plurality of fiberglass reinforced polyester (FRP) panels that are fastened together. These plastic towers gain strength through the supplemental glass fiber in the plastic. FRP towers are generally more costly than the galvanized metal towers. Additionally these prior art towers have to be caulked at the seams, require many fasteners to hold the tower together and can develop leaks at the many joints.

The other type of prior art plastic towers are vertically oriented unitary cylinders. These towers can be very tall, with heights up to 19 feet. The ratio of the height to the cross-sectional area limits the cooling capability of the tower since cross-sectional are is more determinant of cooling capacity. The excessive height of these towers requires these prior art towers to be shipped with the axis of the cylinder oriented horizontally, which complicates off-loading and installation. These units have also been limited to one fan assembly per cylindrical unit.

In view of the above, it is an object of the subject invention to provide a cooling tower that is lighter weight and more durable than prior art cooling towers.

It is another object of the subject invention to provide a cooling tower that substantially avoids complex and costly assembly of components.

It is an additional object of the subject invention to provide a cooling tower that produces low levels of vibration related noise.

It is also an object to provide a unitary molded plastic tower that is not cylindrical and allows a much higher ratio of cross-sectional area to overall height.

It is also an object to provide a cooling tower that can be shipped fully assembled and upright to ease off-loading and installation.

Still a further object of the subject invention is to provide a substantially corrosion resistant cooling tower.

SUMMARY OF THE INVENTION

The subject invention is directed to a cooling tower that is made substantially from plastic. More particularly, a major portion of the cooling tower is defined by a tower shell that is unitarily molded from a suitable plastic, such as polyethylene. The unitarily molded tower shell may be formed by rotational molding. The tower shell may be molded to include air inlet louvers that are unitarily molded with the body of the tower shell. Additionally, short cylindrical flanges may be molded at the top of the tower shell for accommodating fans and necessary support housings for the fans. Apertures may be molded into the tower shell or may subsequently be cut into the tower shell for accommodating fluid pipes and/or conduits for electric cables. Separate fittings may then be mounted to these molded or cut apertures to accommodate connections with pipes or conduits. These separate fittings may be plastic or metal depending upon specifications of the heat exchange system.

The tower shell preferably is elongated and of polygonal cross-sectional shape, such as an octagonal cross-sectional shape. Thus, the cooling tower may include substantially parallel top and bottom surfaces that are aligned or alignable substantially horizontally. The tower shell may further include at least one vertically aligned or alignable side wall that is unitarily formed to extend continuously around the periphery of the tower shell. Angled connecting walls extend between the side walls and the respective top and bottom walls.

Tower shells in accordance with the subject invention may be of different respective lengths to accommodate different cooling demands. However, all of the tower shells may be of substantially constant longitudinal cross-sectional size and shape. Thus, a larger tower shell may differ from a smaller tower shell primarily by the length and by the number of cooling fans accommodated along the length. This use of a uniform cross-sectional shape for all tower shells enables the tower shells to be manufactured in the same or similar rotational molds. The molds may be rotatable about a horizontal axis and may be adapted to adjust the length of the mold by merely repositioning end wall portions of the mold.

The polygonal cross-section of tower shells in accordance with the subject invention enables a uniform width and depth for the fill material that performs the mass transfer function within the tower shell. Additionally, the tapered bottom portion of the polygonal tower shell defines a concave water sump at the bottom of the tower, while the tapered top section achieves an efficient exit air flow.

The tower also has several strengthening ribs designed to provide structural stability where needed. These ribs are a corrugated shape that provides more strength than a straight wall. Additional strength is created by conical ends that help support fan systems on the top of the tower.

Strength also is achieved by the rotational molding. In particular, the rotational molding of a structure as large as the subject cooling towers results in greater thicknesses at locations where surfaces meet at an angle. These greater thicknesses effectively define unitary fillets that add to the strength and vibration resistance. The fillets are particularly helpful at the peripheries of the top and bottom walls at the louvers, at the reinforcing flanges and where the fan-mounting flanges meet the top wall. Thus, the subject cooling towers avoid the complex assembling inefficiencies of the prior art and simultaneously enhance strength and efficiency at critical locations.

BRIEF DESCRIPTION OF THE DRAWINGS

FIG. 2 is a front elevational view of the cooling tower shown in FIG. 1.

DETAILED DESCRIPTION OF THE PREFERRED EMBODIMENTS

Figure 1:
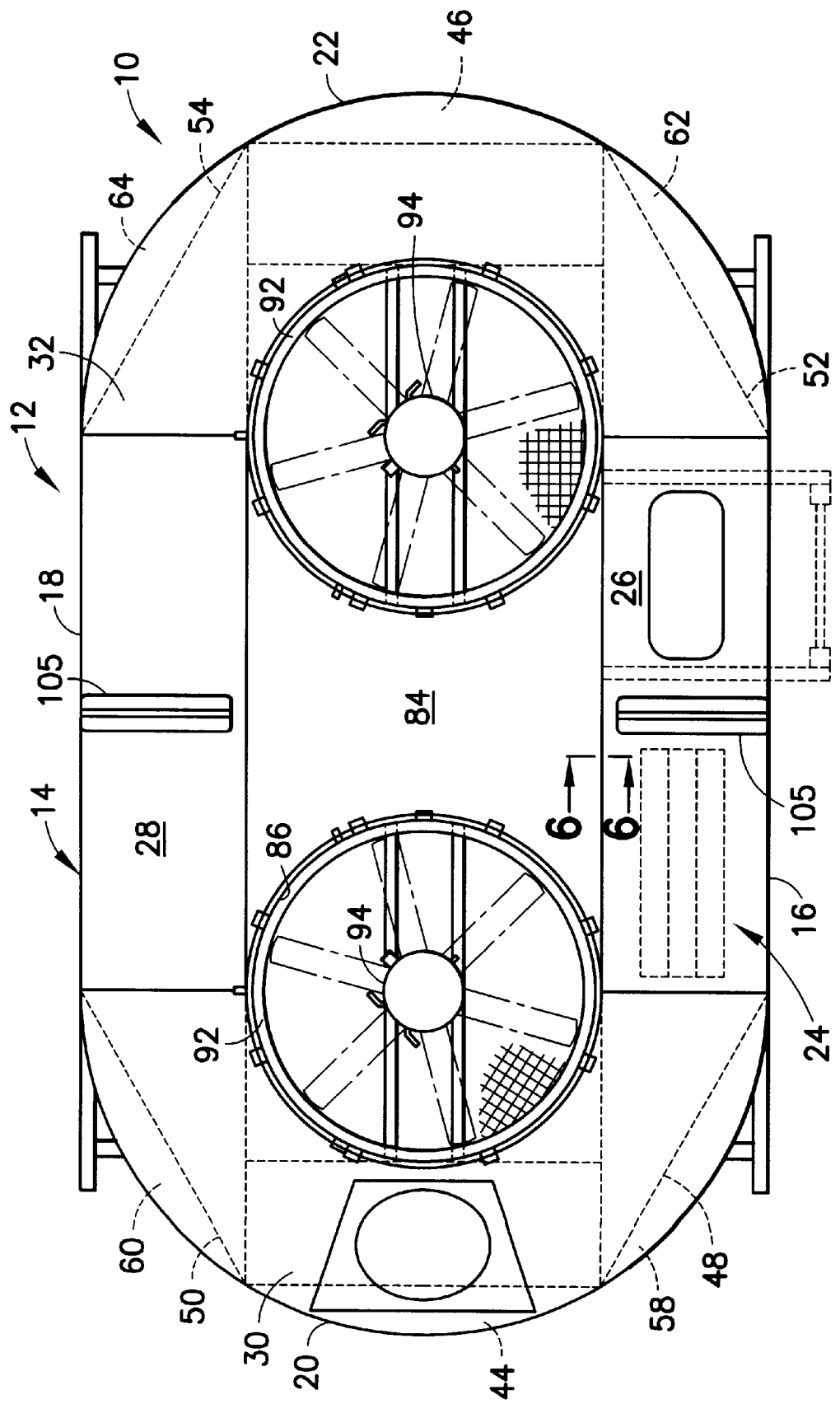
FIG. 1 is a top plan view of a two-fan cooling tower in accordance with the subject invention.
Figure 3:
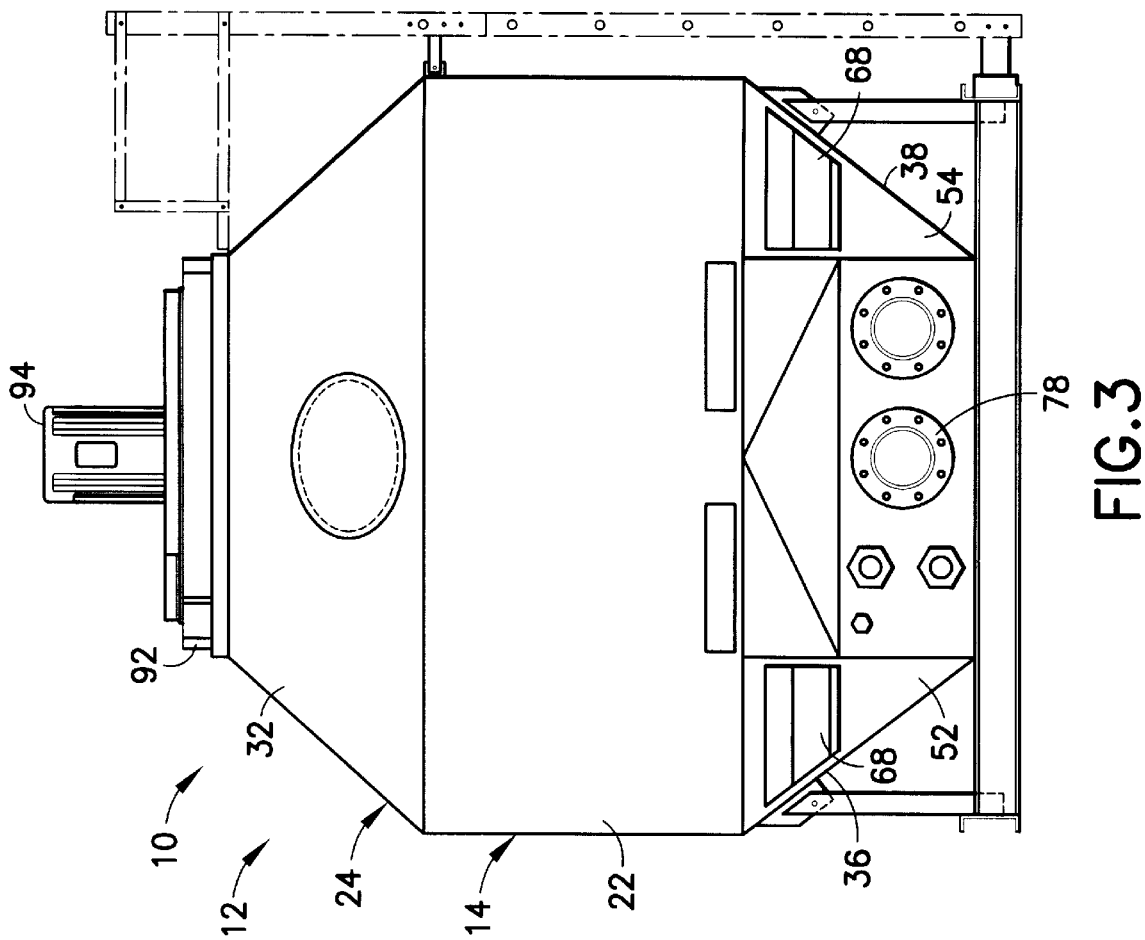
FIG. 3 is an end elevational view of the cooling tower of FIGS. 1 and 2.

A two-fan cooling tower in accordance with the subject invention is identified generally by the numeral 10 in FIGS. 1–3. The cooling tower 10 includes a tower shell 12 that is unitarily molded from polyethylene in a rotational mold. The tower shell 12 is molded to include a substantially vertically aligned side wall 14 extending continuously about the tower shell 12. The side wall 14 includes planar parallel front and rear sections 16 and 18 that extend between semi-cylindrical end sections 20 and 22.

The tower shell 12 further includes the tapered top connecting wall 24 extending unitarily from the side wall 14. The top connecting wall 24 includes planar front and rear sections 26 and 28 respectively which extend unitarily from the planar front and rear side wall section 16 and 18 respectively. Additionally, the tapered top connecting wall 24 further includes conically generated end sections 30 and 32 respectively which extend upwardly and inwardly from the semi-cylindrical sections 20 and 22 respectively of the side wall 14.

The tower shell 12 further includes a tapered bottom connecting wall 34 extending unitarily downwardly and inwardly from the side wall 14. More particularly, the tapered bottom connecting wall 34 includes front and rear panels 36 and 38 that extend from the planar front and rear sections 16 and 18 respectively of the side wall 14. The tapered bottom connecting wall 34 further includes planar bottom end panels 40 and 42 that extend angularly inwardly from opposite ends of the tower shell 12. Upper ends of the end panels 40 and 42 are connected to the side wall 14 by substantially horizontal chordal support panels 44 and 46 respectively. Triangular corner panels 48, 50, 52 and 54 extend between the front and rear panels 36 and 38 and the end panels 40 and 42 of the tapered bottom connecting wall 34. More particularly, the triangular corner panel 48 extends between the front panel 36 and the end panel 40. The triangular corner panel 50 extends between the rear panel 38 and the end panel 40. The triangular corner panel 52 extends between the front panel 36 and the end panel 46, while the triangular corner panel 54 extends between the rear panel 38 and the end panel 42. Upper ends of the lower corner panels 48–54 are connected to lower portions of the side wall 14 by horizontal chordal support panels 58–64. The chordal support panels 44, 46 and 58–64 provide necessary structural support for the tower shell 12 and also support the PVC fill 66 disposed in the tower shell. The front and rear lower panels 36 and 38 and the triangular lower corner panels 48–54 all are molded to include louvers 68 for accommodating an upward air flow.

The tower shell 12 further includes a planar bottom wall 70 of substantially rectangular configuration extending unitarily between the lower edges of the front and rear panels 36 and 38 and the end panels 40 and 42. The tower is mounted on a support platform 100 constructed of steel or fiberglass reinforced plastic (FRP) that uniformly supports the planar bottom 70 of the tower. This support platform also has support legs 101 that protrude perpendicular to the bottom of the tower to provide additional support for the side walls 14. End support enclosures 72 and 74 extend unitarily downwardly from the lower end panels 40 and 42 and terminate in substantially coplanar relationship with the bottom wall 70. Portions of the end enclosure 74 are provided with circular apertures 78 extending therethrough for accommodating fittings to deliver electrical conduits and pipes to the cooling tower 10. Strengthening ribs 105 are molded corrugations placed several places in the tower to provide enhanced strength over a straight wall.

The tower shell 12 further includes a substantially oval top wall 84 which extends unitarily between and joins upper end regions of the tapered upper wall 24. The top wall 84 is molded to include first and second circular fan openings 86 and 88 respectively.

As shown most clearly in FIG. 2, the tower shell 12 assumes a substantially octagonal profile when viewed from the front and from the rear. Additionally, as shown in FIG. 3, the tower shell 12 assumes a substantially octagonal profile and cross-section when viewed from the left or right ends.

As noted above, the tower shell 12 is used with fittings at apertures 78 in the end enclosure 74. Still further, a coated steel fan ring 92 may be mounted to each of the fan apertures 86 and 88 in the top wall 84. Fans 94 along with the appropriate hardware and motors then are mounted to the fan rings 92 for generating an upward flow of air through the louvers 68 and out of the fan apertures 86 and 88.

Figure 4:
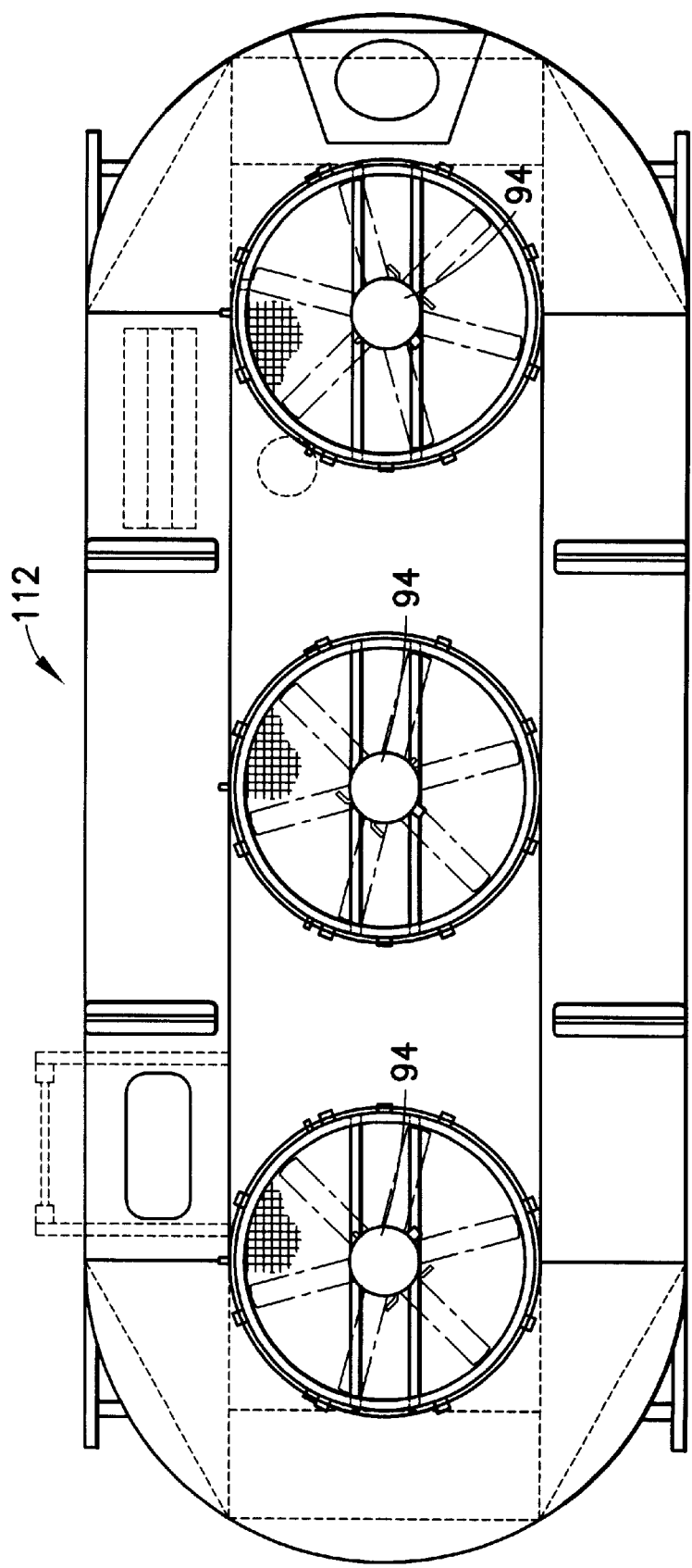
FIG. 4 is a top plan view of a three-fan cooling tower in accordance with the subject invention.
Figure 5:
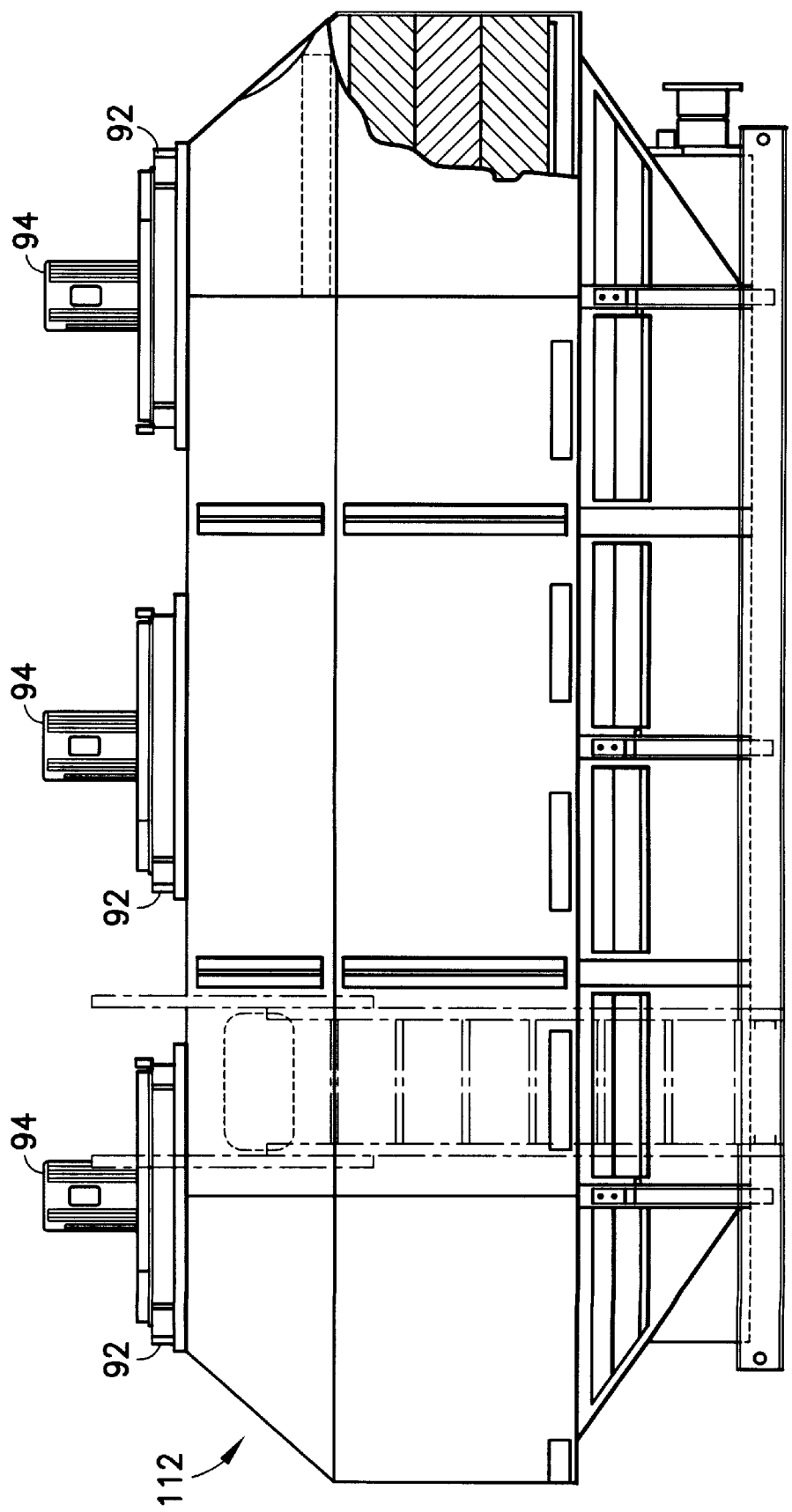
FIG. 5 is a front elevational view of the three-fan cooling tower shown in FIG. 4.

The tower shell 12 is unitarily formed in a rotational mold that rotates about an axis extending from left to right in FIG. 1. The mold may be elongated to provide a larger tower shell as shown in FIGS. 4 and 5 respectively. More particularly, FIGS. 4 and 5 show a tower shell 112 that is structurally and functionally similar to the tower shell 12 shown in FIGS. 1–3. Additionally, the end view of the tower shell 12 shown in FIG. 3 is substantially identical to the end view for the tower shell 112. However, the tower shell 112 differs by being sufficiently elongated to accommodate a third fan. Furthermore, additional supports are provided at the tapered lower front and rear panels, on planar portions of the side panels and on the elongated planar portions of the upper panel. The tower shell 12 shown in FIGS. 1–3 defines an overall length of approximately 15 feet. In contrast, the tower shell 112 shown in FIGS. 4 and 5 to define an overall length of almost 22 feet.

Figure 6:
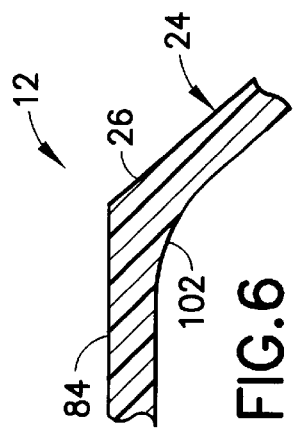
FIG. 6 is a cross-sectional view taken along line 6—6 in FIG. 1.

The rotational molding results in greater thickness at locations where walls, panels, flanges and/or ribs meet at an angle. For example this greater thickness defines a unitary fillet 102 as illustrated in FIG. 6 where the oval top wall 84 intersects the planar front section 26 of the tapered top connecting wall 24. The fillets define a thickness approximately twice the thickness of other locations. For example, the nominal plastic thickness at most locations on the tower shell 12 is approximately 0.375 inch. However the unitary fillets define thicknesses of about 0.750 inch. Comparable fillets exist at other intersecting surfaces. In particular, unitary fillets exist at the strengthening ribs 105, at the louvers 68, and at the fan apertures 86 and 88. These unitary fillets add to strength and vibration resistance.

What is claimed is:

1. A cooling tower having a tower shell unitarily molded from a plastic material, the tower shell comprising opposed substantially parallel top and bottom walls, the top wall having a plurality of fan openings formed therein for accommodating a corresponding plurality of fans, a tapered top connecting wall projecting outwardly and downwardly from the top wall, a tapered bottom connecting wall projecting outwardly and upwardly from the bottom wall, the bottom connecting wall including a plurality of louvers unitarily molded therein, and a side wall extending between the bottom connecting wall and the top connecting wall, the side wall comprising substantially planer parallel front and rear sections and substantially semi-cylindrical end sections extending between the front and rear sections, the top connecting wall having substantially planar sections extending upwardly and inwardly from the planer front and rear sections of the side wall and having tapered end sections extending upwardly and inwardly from the semi-cylindrical sections of the side wall, and support walls extending inwardly from locations in proximity to intersections of the side wall and the bottom connecting wall for supporting plastic fill material in the tower shell.

2. The cooling tower of claim 1, wherein the side wall is aligned substantially orthogonally to the top and bottom walls.

3. The cooling tower of claim 2, further comprising a plurality of corrugated strengthening ribs unitarily molded with the tower shell at least on planar portions of the tapered top and bottom connecting walls and on planar portions of the side wall.

4. The cooling tower of claim 1, wherein the bottom connecting wall is defined by a plurality of intersecting planar panels.

5. A cooling tower having a tower shell unitarily molded from a plastic material, the tower shell comprising opposed substantially parallel top and bottom walls, the top wall having a plurality of openings formed therein for mounting a corresponding plurality of fans, a tapered top connecting wall projecting outwardly and downwardly from the top wall, a tapered bottom connecting wall projecting outwardly and upwardly from the bottom wall, and a side wall extending between the bottom connecting wall and the top connecting wall, the tapered top and bottom connecting walls intersecting the respective top and bottom walls and the side wall at a plurality of angular intersections, said tower shell having fillets at said angular intersections, said fillets being unitary with the respective walls defining the angular intersections for reinforcing said tower shell and for resisting vibrations, said fillets defining a plastic thickness greater than thicknesses of said plastic material at locations on the respective walls at locations spaced from the fillets.

6. The cooling tower of claim 5, wherein the bottom connecting wall includes a plurality of louvers unitarily molded therein.

7. The cooling tower of claim 5, wherein the side wall includes substantially planar parallel front and rear sections and substantially semi-cylindrical end sections extending between the front and rear sections, the top connecting wall having substantially planar sections extending upwardly and inwardly from the planar front and rear sections of the side wall and having substantially conically generated sections extending upwardly and inwardly from the semi-cylindrical sections of the side wall.

8. The cooling tower of claim 5, wherein the plastic material at the fillets is approximately twice as thick as the plastic material on the unitarily molded tower shell at locations spaced from the fillets.

9. The cooling tower of claim 5, wherein the fillets extend across the angular intersections and onto portions of the respective walls defining the respective angular intersections.

10. The cooling tower of claim 5, wherein the tower shell has an interior, said interior of the tower shell being free of transverse interior walls connecting spaced apart locations on the side wall.

* * * * *